(12) United States Patent
Self (10) Patent No.: US 10,588,449 B2
(45) Date of Patent: Mar. 17, 2020

(54) CUTTING DEVICE

(71) Applicant: Steven Jay Self, Burbank, CA (US)

(72) Inventor: Steven Jay Self, Burbank, CA (US)

( * ) Notice: Subject to any disclaimer, the term of this patent is extended or adjusted under 35 U.S.C. 154(b) by 288 days.

(21) Appl. No.: 15/784,451

(22) Filed: Oct. 16, 2017

(65) Prior Publication Data

US 2019/0110632 A1  Apr. 18, 2019

(51) Int. Cl.
  *A47J 19/02*  (2006.01)
  *A47J 31/36*  (2006.01)
  *A47J 31/06*  (2006.01)
  *A47J 31/44*  (2006.01)

(52) U.S. Cl.
  CPC .......... *A47J 31/3628* (2013.01); *A47J 31/06* (2013.01); *A47J 31/44* (2013.01)

(58) Field of Classification Search
  CPC ............... B29B 17/02; A47J 19/02–022; A47J 31/06–0689; A47J 2043/04409–04445
  See application file for complete search history.

(56) References Cited

U.S. PATENT DOCUMENTS

| 3,863,339 A | 2/1975 | Reaney et al. |
| 4,224,737 A | 9/1980 | Hart |
| 4,233,734 A | 11/1980 | Bies |
| 4,862,590 A | 9/1989 | Winyard et al. |
| 5,475,925 A | 12/1995 | Newman et al. |
| 5,515,609 A | 5/1996 | Sperti |
| 5,740,612 A * | 4/1998 | Takeshita ................ B26B 27/00 30/1.5 |
| 6,581,498 B2 | 6/2003 | Beyer |
| 7,797,838 B2 | 9/2010 | Chu |
| 2007/0180701 A1 | 8/2007 | Hutt |
| 2008/0189954 A1 | 8/2008 | Lin |
| 2010/0011966 A1 * | 1/2010 | Nielsen .................... A47J 31/32 99/302 R |
| 2016/0297659 A1 * | 10/2016 | Minnier .............. A47J 31/0673 |

FOREIGN PATENT DOCUMENTS

| CH | 699502 | * | 8/2008 |
| CH | 704029 | * | 4/2012 |
| DE | 102017001155 | * | 8/2018 |
| EP | 0279737 | | 1/1994 |
| ES | 1216715 | * | 8/2018 |
| WO | WO 2018235044 | * | 12/2018 |

* cited by examiner

*Primary Examiner* — Michael A Laflame, Jr.
(74) *Attorney, Agent, or Firm* — Cohen IP Law Group, P.C.; Michael N. Cohen (57) ABSTRACT

A device that may be configured to cut and remove the shell of a coffee pod is disclosed. The device may include a handle with a pod holder and a blade that may be set to different positions to cut the shell at different depths. The coffee pod may be held within the pod holder by locking tabs and may be rotated to sever the shell. The shell may be removed and recycled.

20 Claims, 4 Drawing Sheets

CUTTING DEVICE

FIELD OF THE INVENTION

The current invention generally relates to a cutting device. In particular, the invention relates to a device that cuts through the shell of a coffee pod to allow the contents to be removed and the shell to be recycled.

BACKGROUND OF THE INVENTION

Home coffee brewing systems have been in use for some time. In recent years however, coffee machines that utilize coffee pods have become very popular. In particular, the use of the K-Cups® brand coffee pods manufactured by Keurig is widespread. And while these types of machines allow high quality coffee to be brewed with little to no mess and without much effort, the environmental consequences of the product are alarming.

For instance, over 21 billion coffee pods are discarded in the United States every year, and unfortunately, most of the pods (95%) are not recyclable. As such, the discarded coffee pods end up in landfills. In fact, according to studies by the National Coffee Association, the vast quantity of discarded coffee pods in 2013 could circle the globe more than ten times.

However, it is interesting to note that the individual components of the typical coffee pod—the plastic shell, paper filter, foil lid and coffee grounds—are recyclable on their own. However, the small quantity of each material and the hybrid construction of each capsule make it too difficult for recycling facilities to dismantle and sort. In addition, many recycling facilities will not accept recyclable materials if they include food products such as coffee grounds.

Accordingly, there is a need for a device that facilitates the easy dismantling of used coffee pods so that their individual components may be recycled or otherwise used for secondary purposes (for example, the coffee grounds may be used as mulch).

In addition, there is a need for a device that may sever or otherwise cut the coffee pod apart in a safe fashion so that there is no risk of harm to the user.

SUMMARY OF THE INVENTION

In a first aspect of the invention, a cutting device configured to cut the shell off of used coffee pods is disclosed. The cutting device may include a handle assembly, a pod holder assembly and a cutter assembly. The handle assembly may allow the user to generally hold and grasp the device to be used. The pod holder assembly may include an opening that may be configured to receive and hold the pod, and the cutter assembly may make the cut.

In another aspect of the invention, the handle may include a front end that may be configured with the pod holder and a cavity that may receive the cutting assembly.

In another aspect of the invention, the pod holder may include a receptacle with an opening that may receive and hold the coffee pod.

In another aspect of the invention, the opening may include a circumferential ridge around its diameter that the coffee pod may fit into.

In another aspect of the invention, the pod holder may include a locking tab that may lock the coffee pod within the circumferential ridge.

In another aspect of the invention, the cutter assembly may include a cartridge, a blade sled, a blade with a sharpened edge, a sled cap with a thumb post, a lid with a longitudinal slot, and a thumb piece.

In yet another aspect of the invention, when cutter assembly is configured it may fit within the cavity in the handle.

In another aspect of the invention, the movement of the thumb piece may facilitate the movement of the blade.

In another aspect of the invention, the blade may be positioned within the cutter assembly.

In another aspect of the invention, the blade may be positioned to extend from the cutter assembly and cut into the shell of the coffee pod.

In yet another aspect of the invention, the thumb piece may include a front locking tab that may lock the coffee pod within the receptacle when the blade is deployed.

In another aspect of the invention, the coffee pod may be rotated about its vertical axis so that the blade cuts along its circumference. When the coffee pod is rotated a full 360°, the shell of the coffee pod may be completely severed.

In another aspect of the invention, the blade may be deployed to a first position that may sever the shell of the coffee pod, and to a second position that may also sever the filter that may be within the shell.

In another aspect of the invention, the lid and/or the thumb piece may have tick marks to facilitate the setting of the blade's position.

In yet another aspect of the current invention, the blade may be removed to be sharpened or replaced when it becomes dull or otherwise damaged.

In another aspect of the invention, the pod holder assembly may be removable and replaceable. This may be useful to fashion the cutting device with different holders with different diameters to accommodate different coffee pods with different diameters.

In another aspect of the invention, the diameter of the pod holder may be adjustable.

In another aspect of the invention, the cutter device may include an adapter that may allow coffee pods of smaller diameters to be used with a holder of a larger diameter.

Other aspects of the invention are discussed herein.

DETAILED DESCRIPTION OF THE PREFERRED EMBODIMENTS

The following detailed description is not intended to limit the current invention. Alternate embodiments and variations of the subject matter described herein will be apparent to those skilled in the art.

The cutting device 10 of the current invention and the benefits it may provide are now described with reference to the figures. Where the same or similar components appear in more than one figure, they are identified by the same or similar reference numerals.

Before describing cutting device 10 in detail, it is important to understand the general construction and composition of a typical coffee pod used to brew coffee with brewing machines from Keurig, Hamilton Beach, Mr. Coffee, and others. Note that the coffee pods are also referred to as K-Cups®. Each coffee pod may generally include a shell and a top lid. The shell may contain the coffee grounds to be used to brew the coffee as well as a paper filter to keep the grounds within the pod. The shell may typically comprise a blend of plastics that may be molded into the "cup" shape to be used with the coffee maker. In addition, top lid 404 may typically comprise a foil lid that may be easily punctured by the coffee machine in order to inject hot water into the coffee grounds contained inside the pod.

Note that the individual components—the shell, lid, coffee grounds and paper filter—may be recyclable or composted on their own, but as a combination they pose a significant challenge to recycling facilities to dismantle, sort and recycle the small containers. For this reason, the coffee pods are not accepted by recycling facilities as candidates for recycling. However, if the components are dismantled from each other, they can then be recycled individually.

Taking this into account, cutting device 10 allows for the shell of a coffee pod to be easily cut and removed so that the shell may then be recycled. As such, cutting device 10 provides a tool that may secure the coffee pod while the shell of the pod is safely cut and removed.

Figure 1:
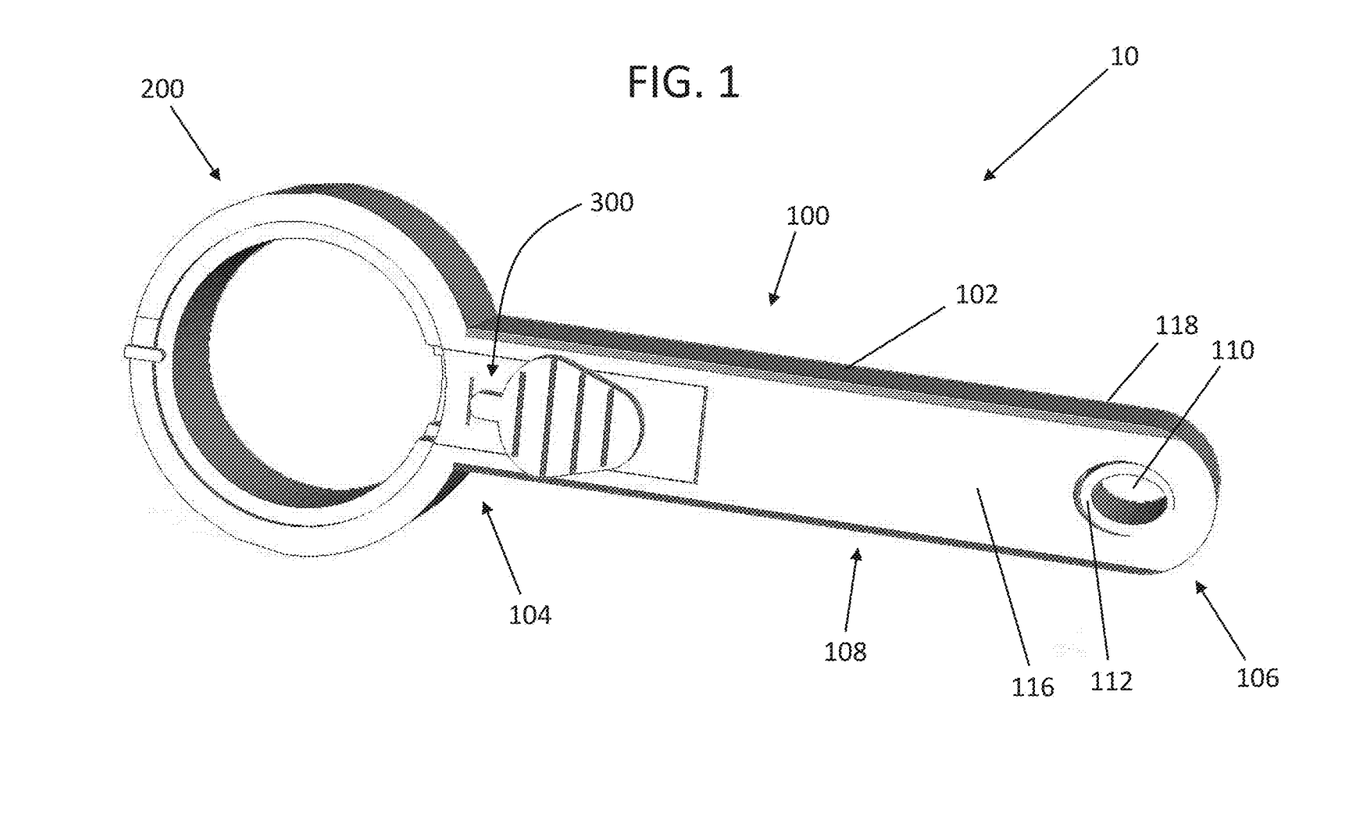
FIG. 1 is a perspective view of a cutting device.

As shown in FIG. 1, cutting device 10 may include a handle assembly 100, a pod holder assembly 200 and a cutter assembly 300. Additional components and/or assemblies may also be included and may be described in later sections. In general, the user of cutting device 10 may grasp or otherwise hold cutting device 10 by gripping handle assembly 100. The user may then insert the coffee pod to be cut into pod holder assembly 200, and utilize cutter assembly 300 to cut and remove the pod's outer shell. The contents of the pod may then be removed and the components of the pod may be recycled, used for other purposes or discarded. Cutter device 10 may be used in the home, in the office, at restaurants, coffee shops and hotels, or wherever coffee pods may be used and/or dispensed.

Figure 2:
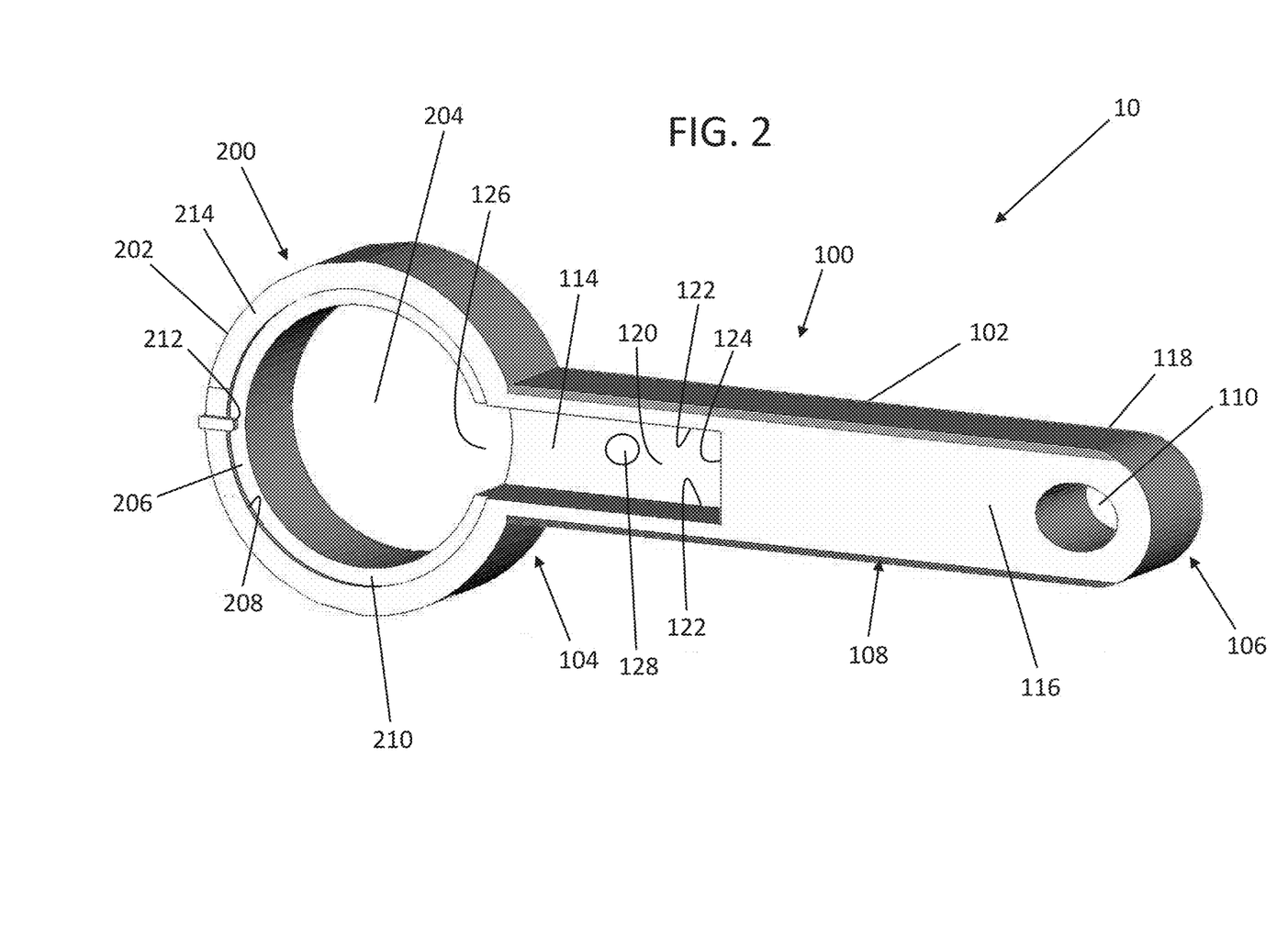
FIG. 2 is a perspective view of a cutting device.

Referring now to FIGS. 1-2, cutting device 10 will be described in further detail. As shown, handle assembly 100 may include handle shaft 102 that may include a front end 104, a back end 106 and a body 108. Handle shaft 102 may have a cross section that may be generally square, rectangular, round, oval or may be other shapes, and may be formed out of plastic, wood, metal or other types or combinations of types of materials. Front end 104 of shaft 102 may be configured with pod holder assembly as will be described in later sections. Back end 106 of shaft 102 may be rounded or may be another shape, and may include opening 110 that may pass from the front side 116 of shaft 102 to the back side opposite front side 116 of shaft 102. Opening 110 may also include sheath 112 that may be configured with opening 110 and that may generally fit within the inner circumference of opening 110. Sheath 112 may also include an inner opening such that at least a portion of opening 110 may continue to extend from the front side 116 of shaft 102 to the back side of shaft 102 when sheath 112 is in place. In this way, sheath 112 may provide protection to the inner circumference of opening 110. The purpose of opening 110 and sheath 112 may be to allow for handle shaft 102 to be hung from a post that may pass through opening 110 for easy storage.

As shown in FIG. 2, the front end 104 of handle shaft 102 may also include cavity 114 that may be generally located in the front side 116 of handle shaft 102. Cavity 114 may include a bottom surface 120, side walls 122, back wall 124 and front area 126. Cavity 114 may extend longitudinally from its back wall 112 to its front area 126 that may generally extend into pod assembly 200. As such, front area 126 may be generally open as shown. Also, cavity 114 may be rectangular in shape or may be of other shapes as necessary. In addition, cavity 114 may include hole 128 in its bottom surface 120 that may pass through bottom surface 120 to the back surface of handle shaft 102. Note that the purpose of cavity 114 and hole 128 may be to receive and secure cutter assembly 300 as will be described in later sections. Accordingly, the dimensions of cavity 114 may be chosen to receive and be configured with cutter assembly 300.

Pod holder assembly 200 may include receptacle ring 202 that may define opening 204. Ring 202 and opening 204 may be generally circular in shape but may also be formed into other shapes as required. Ring 202 may also include circumferential ridge 206 that may extend symmetrically around its front inner circumferential edge as shown. In addition, ridge 206 may include side wall 208 and bottom surface 210 that may generally define the ridge.

Figure 3:
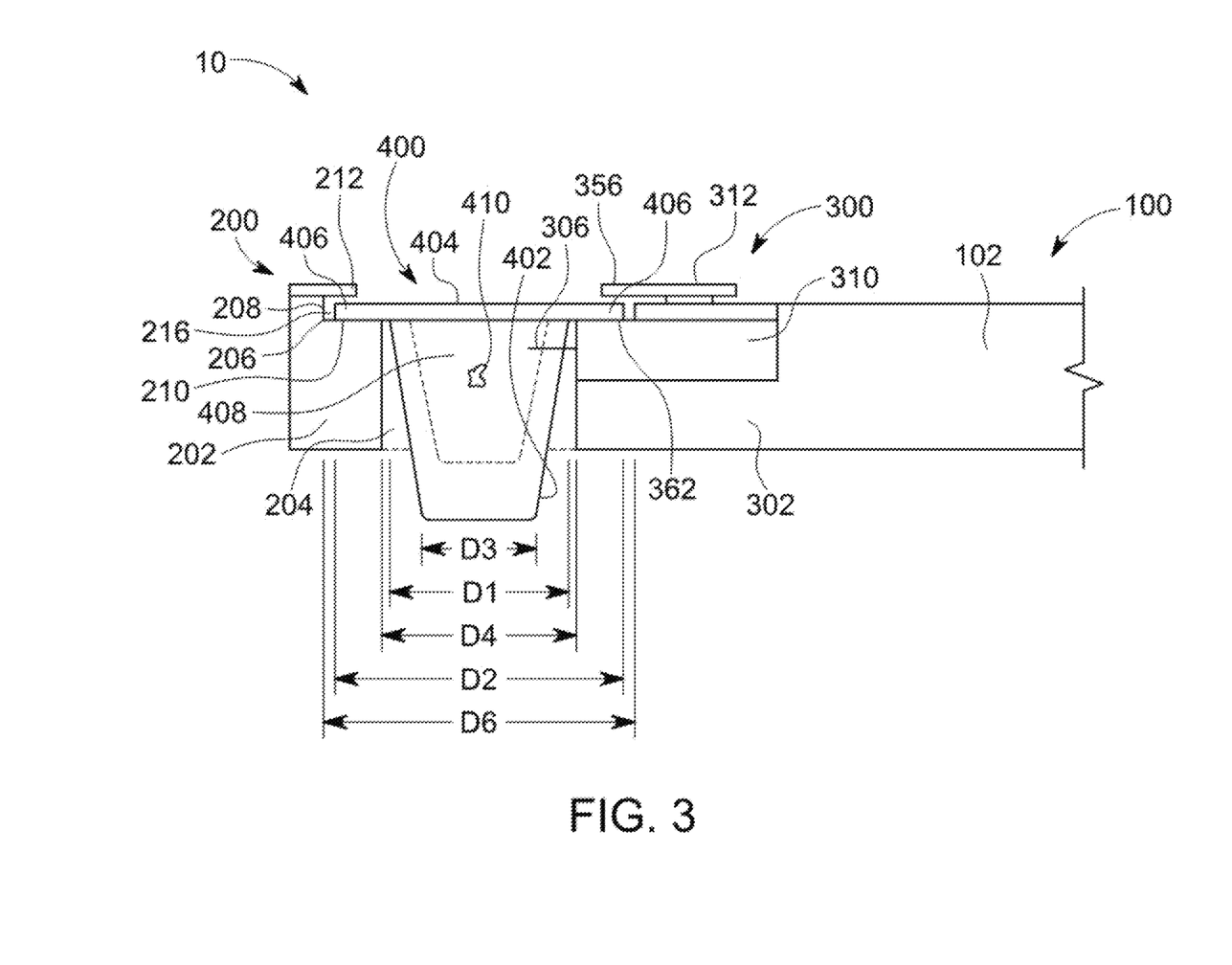
FIG. 3 is a side cut-away view of a cutting device holding a coffee pod.

Turning attention now to FIG. 3, coffee pod 400 (shown in a cut-away view and configured within pod holder assembly 200) may include shell 402 with a top diameter D1, sealed by top lid 404 with an outer diameter of D2. Note that top lid 404 may comprise a foil lid that may extend radially outward past the diameter D1 of the top of shell 402 to define the outer diameter D2 of the lid 404. In this way, lip 406 may be formed around the top circumference of shell 402 as depicted. Also, diameter D3 of the bottom of shell 402 may typically be smaller than diameter D1. Coffee pod 400 may also include a paper filter 408 within shell 402 (depicted with dashed lines) that may contain coffee grounds 410.

Ring 202 of pod holder assembly 200 may have in inner diameter D4 and circumferential ridge 206 may have an outer diameter D6 measured to its side walls 208. As shown, coffee pod 400 may be inserted into ring 202 to be secured within pod holder assembly 200. Note that it may be preferable for diameter D4 to be slightly greater than diameter D1 so that the shell 402 of coffee pod 400 may fit within opening 204. It may also be preferable that diameter D4 of opening 204 be slightly less than diameter D2 of top lid 404 so that top lid 404 may not pass through opening 204. Also, it may be preferable that diameter D6 of circumferential ridge 206 be slightly greater than diameter D2 of top lid 404 so that lip 406 may fit into circumferential ridge 206 and rest on its bottom surface 210. It should be noted that different brands of coffee pods 400 may offer coffee pods 400 with different diameters that may in turn require different diameter receptacle rings 202 as will be described in sections below.

Note also that as depicted in FIGS. 2-3, pod holder assembly 200 may include locking tab 212 on the front end of cutting device 10 that may extend from front surface 214 of ring 202 over the top of side wall 208 of circumferential ridge 206. As shown, it may be preferable for locking tab 212 to only slightly extend over side wall 208 (for example, in the amount of 1 mm-5 mm). In this way, there may be a gap 216 that may be formed between the bottom of locking tab 212 and the bottom surface 210 of circumferential ridge 206.

With coffee pod 400 inserted into ring 202, locking tab 212 may extend over a portion of lip 406 of top lid 404 of coffee pod 400. In this way, lip 406 may be configured within gap 216 such that locking tab 212 may secure this portion of lip 406 within circumferential ridge 206. When placing coffee pod 400 into opening 202, it may be preferable to first insert this portion of lip 406 into gap 216 and then the rest of coffee pod into opening 202 such that lip 406 is configured within gap 216. The lip 406 may also be pressed onto locking tab 212 to be snapped into the gap 216.

Figure 4:
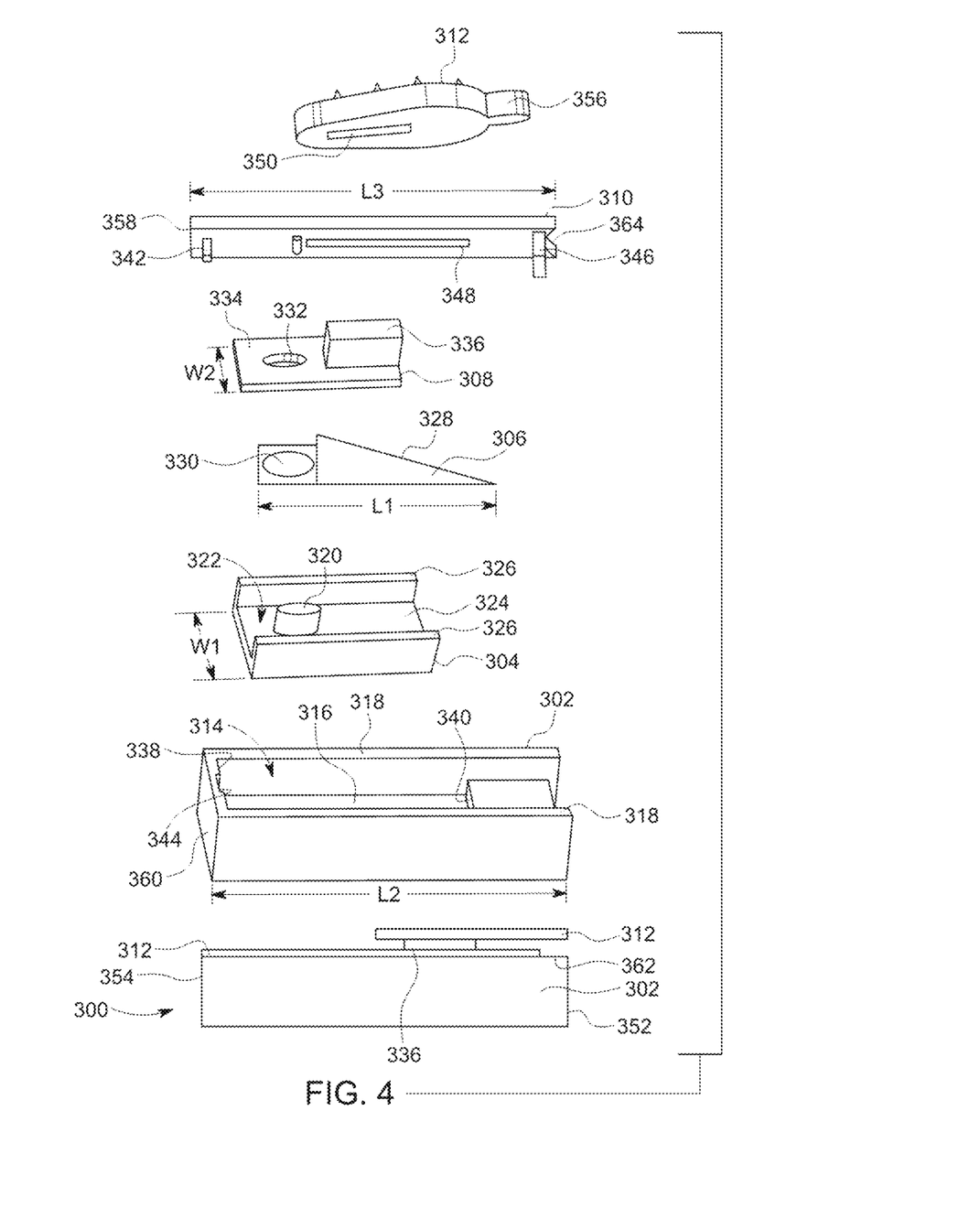
FIG. 4 is an expanded component view of a cutting assembly.

Moving on, cutter assembly 300 will now be described in detail. As depicted in FIG. 4, cutter assembly 300 may have a front 352 and a back 354 and may include knife cartridge 302, blade sled 304, blade 306, sled cap 308, cartridge lid 310 and thumb piece 312. Additional components and/or assemblies may also be included and may be described in later sections. Cartridge 302 may generally represent the body of cutter assembly 300 with length L1 and may include recess 314 formed by bottom surface 316 and side walls 318. Blade sled 304 may have a width W1 that may be slightly less than the internal width of recess 314 defined by the distance between side walls 318. In this way, blade sled 304 may fit into recess 314. It may be preferable that blade sled 304 fit within recess 314 such that it may move freely forward and backward within recess 314 but may not move freely side-to-side between side walls 318. Note however that the backward movement of blade sled 304 may be restricted by back wall 338 and that its forward movement may be restricted by stop 340 which may be in the form of a small step in bottom surface 316.

Blade sled 304 may include channel 322 that may be defined by bottom surface 324 and side walls 326. In addition, blade sled 304 may also include blade post 320 that may extend upward from bottom surface 324. In general, channel 322 with blade post 320 may be configured to receive blade 306. Blade 306 may be a generally flat blade that may include sharpened edge 328 and opening 330. In this way, blade 306 may be configured within channel 322 and blade post 320 may pass through opening 330. It may be preferable that opening 330 have the same general size and shape of blade post 320 so that blade post 320 may fit snugly within opening 330. In addition, blade 308 may have a width that may be smaller than the distance between side walls 326. In this way, blade 306 may be positioned between side walls 326 and against bottom surface 324 while being held securely by blade post 320. Also, blade 306 may have a length L2 that may allow for the tip of sharpened edge 328 to extend past the forward side of blade sled 304. In this way, blade 306 may be positioned to cut into shell 402 of coffee pod 400 as will be described in later sections.

Next, sled cap 308 may be configured to provide a top to blade sled 304 and to secure blade 306 within. Sled cap 308 may have a width W2 that may be slightly less than the distance between side walls 326 of blade sled 304, and may also include opening 332 that may be configured to receive blade post 320. With blade 306 configured within channel 322 of blade sled 304 as described above, sled cap 308 may be configured to fit between side walls 326 and the top of blade post 320 may be received within opening 332. It may be preferable that opening 332 have the same general size and shape of blade post 320 so that the top of blade post 320 may fit snugly within opening 332. It may also be preferable that sled cap 308 fit snugly between side walls 326 so that it may be securely attached, and that its top surface 334 may be flush with the top of side walls 326 and blade post 320 so that the top of the combined unit may be generally flat and free of disjunctions. In addition, sled cap 308 may include thumb piece post 336 that may extend upward from top surface 334. Note that the combined unit comprising of blade sled 304, blade 306 and sled cap 308 may slide freely forward and backward within recess 314 of cartridge 302 but not side-to-side.

Next, cartridge lid 310 may be configured to provide a top to cartridge 302 with the combined unit comprising of blade sled 304, blade 306 and sled cap 308 configured within its recess 314. Cartridge lid 310 may have the same or similar width as cartridge 302 so that when it is placed on top of cartridge 302 it may cover the top from side-to-side and the sides of cartridge 302 and lid 310 may be flush and free of disjoints. However, it may be preferable that length L3 of lid 310 be less than the length L1 of cartridge 302 by an amount generally equal to the radial dimension of the bottom surface 210 of circumferential ridge 206 (as seen in FIG. 3). It may also be preferable that lid 310 be configured with cartridge 302 such that the rear end 358 of lid 310 is flush with the rear end 360 of cartridge 302, and that the resulting rear wall of cutter assembly 300 be smooth and free of disjoints.

Given this, it can be seen that because lid 310 may have a length L3 that may be slightly less than length L1 of cartridge 302, there may be a small ridge 362 formed on the top front 352 of cutter assembly 300 when lid 310 is configured to provide a top to cartridge 302. And as will be seen below, this ridge 362 may match with circumferential ridge 206 in the front area 126 of cavity 114 (as seen in FIGS. 2 and 3) when cutter assembly 300 is configured in cavity 114 of holder assembly 100 to provide a complete combined 360° circumferential ridge around opening 204. It may be preferable that front end 352 have a rounded contour similar to the rounded contour of circumferential ridge 206 so that the overall shape of the combined ridges 362, 206 is generally round and symmetrical.

Cartridge lid 310 may also include back tab 342 that may slide into back slot 344 in back wall 338 of cartridge 302 to provide lid 310 with vertical support, and front tab 346 that may generally extend downward to a position just above stop 340 within recess 314 when the lid 310 is in place. It may be preferable that there remain a slight opening of free space between the bottom of front tab 346 and the top of stop 340 to allow blade 306 to move forward over stop 340 and below front tab 346 when extended. This will be described in more detail in later sections.

Cartridge lid 310 may also include longitudinal slot 348 that may pass through lid 310 to receive thumb piece post 336. In this way, with lid 310 configured to form the top of cartridge 302, thumb piece post 336 may pass upward through slot 348. Note that it may be preferable for thumb piece post 336 have a width that may be slightly less than the width of slot 348 so that post 336 may pass through slot 348 and move freely forward and backward within the slot 348. It may also be preferable that post 336 have a height such that a portion of post 336 may extend past the top surface of lid 310 when lid 310 is configured to be the top of cartridge 302.

Next, thumb piece 312 may include bottom slot 350 that may be configured to receive the top portion of post 336 that may extend past the top surface of lid 310. Slot 350 may have a similar size and shape as post 336 so that post 336 may be secured within slot 350 and be held secure within the slot 350. It may be preferable that slot 350 extend partially through thumb piece 312 to receive enough of the top of post 336 in order to be adequately secured to post 336, but preferably not all the way through thumb piece 312. The top of post 336 may be secured within slot 350 by pressure fit, friction, and adhesive or by other means. In addition, thumb piece 312 may include front locking tab 356 that will be described in further detail in later sections. Also, the top surface of thumb piece 312 may include ridges, grooves or other texturing to assist with gripping thumb piece 312 for movement. With thumb piece 312 secured to post 336, it can be seen that lid 310 may be locked in place by thumb piece 312, and that the components of cutter assembly 300 may all be securely configured together to form the assembly 300.

In practice, the combination of thumb piece 312, blade sled 304, blade 306 and sled cap 308 may slide forward and backward as part of cutter assembly 300. The backward movement of the combination may be restricted by back wall 338 and its forward movement may be restricted by stop 340. It may also be preferable that longitudinal slot 348 in cartridge lid 310 have sufficient length so that it may not obstruct the full longitudinal movement of said combination within cartridge 302 and cutter assembly 300.

Note that with thumb piece 312 positioned to its full back position that blade 306 may be fully contained within cutter assembly 300 and may be completely shielded. In this way, the blade 306 can cause no harm. However, as thumb piece 312 may be moved forward, blade sled 304 may slide forward and protrude from the end of cutter assembly 300 (as shown in FIG. 3). This will be described in further detail in later sections.

Turning attention back to FIG. 1 and FIG. 3, cutter assembly 300 assembled as described above may have dimensions similar to cavity 114 in handle assembly 100. In this way, cutter assembly 300 may fit snugly within cavity 114. In addition, it can be seen that with cutter assembly 300 configured inside cavity 114, the front 352 of cutter assembly 300 may be generally positioned in the front area 126 of cavity 114 (note that front area 126 is depicted in FIG. 2). In this position, ridge 362 may match up with ridge 206 so that the combination of ridges 362 and 206 may generally form a complete 360° circumferential ridge around opening 204. In this way, when coffee pod 400 is placed within receptacle ring 202 its lip 406 of top lid 404 may rest in the combination of ridges 362 and 206. It may also be preferable that the front 352 of cutter assembly not extend into opening 204 in any way that may obstruct coffee pod 400 when it is in this position. Also, front 352 may include a generally rounded contour that may match the rounded contour of receptacle ring 202 but this may not be required.

Cutter assembly 300 may be secured within cavity 114 by a screw that may pass through hole 128 in the bottom surface 120 of cavity 114. The screw may pass through hole 128 from underneath and may be threaded into a nut or a threaded hole that may be configured in the bottom of cartridge 302. Also, hole 128 may be countersunk so that the head of the screw may be positioned within the countersink and not extend past the bottom surface of handle assembly 100. It should be clear however that cutter assembly 300 may also be secured within cavity 114 by other means such as adhesive, pressure fit, locking tabs or other attachment mechanisms as necessary.

In practice, cutting device 10 may be used as follows:

With thumb piece 312 positioned in its back position and blade sled 304 generally abutted with back wall 338 of cartridge 302, blade 306 may be retracted and generally contained within cutter assembly 300. As such, blade 306 may be completely shielded. In this configuration, coffee pod 400 may be inserted into opening 204 of receptacle ring 202 as depicted in FIG. 3. Note that lip 406 of top lid 404 of coffee pod 400 may be configured within gap 216 between locking tab 212 and bottom surface 210 of circumferential ridge 206.

In order to extend blade 306 from cutter assembly 300, thumb piece 312 may be moved forward towards the front end 352 of cutter assembly 300. In doing so, thumb piece 312 may engage blade sled 304 through sled cap 308 and thumb piece post 336 resulting in the forward movement of blade 306. It can be seen that the further thumb piece 312 may be moved forward, the further blade 306 may also be moved forward and generally extended.

It may be preferable that blade 306 have a length L2 that allows it to extend past the front end 352 of cutter assembly 300 when thumb piece 312 is moved forward as described above. It may also be preferable that L2 be sufficiently long such that blade 306 may extend far enough past the front end 352 of cutter assembly 300 to penetrate shell 402 of coffee pod 400 that may be configured within receptacle ring 202 of pod holder assembly 200. In addition, it may be preferable that the tip of blade 306 be sharp enough to penetrate shell 402. Also, as described above, blade 306 may slide between the gap that may exist between the top surface of stop 340 and the support post 346 of cartridge lid 310.

Note also that as depicted in FIG. 3, as thumb piece 312 moves forward and blade 306 is extended, that front locking tab 356 configured with the front of thumb piece 312 may also move forward. In this way, as blade 306 deploys, front locking tab 356 may be positioned to overlap a portion of lip 406 of top lid 404 of coffee pod 400 that may be configured within front ridge 362 formed on the top front 352 of cutter assembly 300. And as such, front locking tab 356 may generally hold this portion of lip 406 within ridge 362. In addition, it can also be seen that at the same time, locking tab 212 may hold a different portion of lip 406 within circumferential ridge 206 (preferable on the side of opening 204 opposite locking tab 356). Given this, coffee pod 400 may be held vertically within ridges 362, 206 by locking tabs 356, 212 respectively such that it may not be removed from pod holder assembly 200. Accordingly, this provides a level of safety to the user of cutting device 10 in that while the blade 306 is exposed, the coffee pod 400 may not fall out of pod holder assembly 200 and the blade may not inadvertently cut or otherwise harm the user. However, it should be noted that coffee pod 400 may not be restricted from rotating about its vertical axis within ridges 362 and 206.

Those of ordinary skill in the art will realize and appreciate, upon reading this description, that this example configuration of cutting assembly 300 is not limiting, and that, in general, different cutting assemblies 300 of different configurations that may deploy blade 306 and front locking tab 356 to accomplish the general results presented in the above examples may also be used.

With coffee pod 400 generally configured and secured within pod holder assembly 200 as described above, and with blade 306 extended and penetrating shell 402, coffee pod 400 may be rotated about its vertical axis. Note that blade 306 may include angled sharpened edge 328 that may engage shell 402 in this configuration, and as shell 402 may be rotated in the direction that further engages shell 402 with sharpened edge 328, blade 306 may cut along the outer circumference of shell 402. As coffee pod 400 continues to be rotated, blade 306 may continue to cut shell 402 along its outer circumference. Once coffee pod 400 may be rotated a full 360°, blade 306 may cut the full circumference of shell 402 such that shell 402 may be completely severed at this juncture.

Once shell 402 has been severed as described above, it and its contents may be removed from cutting device 10 through the bottom of opening 204. Shell 402 may then be sent to be recycled and the other contents may be used for mulch or other uses, or may be generally disposed of. Note however, that top lid 404 of coffee pod 400 may still be held within ridges 362, 206 until thumb piece 312 is moved back to its back position. In this way, locking tab 356, which will move with thumb piece 312, may be removed from the top of ridge 362 such that lip 406 may no longer be held at this juncture. Note also that this action may safely retract blade 306 into cutter assembly 300. Once this has happened, and blade 306 is safely retracted, lid 404 may be lifted out of pod holder assembly 200 to be recycled or otherwise disposed of.

It should be noted that in some instances it may be preferable to only sever shell 402 while leaving paper filter 408 intact, filled with coffee grounds 410 and still attached to top lid 404. For instance, if the coffee grounds are to be simply disposed of, it may be preferable for them to be contained within paper filter 408 so that the combination of lid 404, attached paper filter 408 and coffee grounds 410 may be removed together to avoid spilling of the coffee grounds 410 and creating a mess. However, it can also be seen that in other instances it may be preferable to sever both shell 402 and paper filter 408 during the same cutting procedure. In one example of this, if the coffee grounds 410 are meant to be used as mulch and therefore need to be removed from paper filter 410, it may be preferable to cut through paper filter 408 during the same cutting procedure so that they may be easily removed without the added step of having to use scissors or another utensil to cut open the paper filter 408.

As a solution for this, blade 306 may be deployed to extend at different lengths from cutter assembly 300. It can be seen that as thumb piece 312 is moved forward, blade 306 may gradually be extended. Given this, thumb piece 312 may be set to a position that may extend blade 306 an amount far enough that it may penetrate shell 402 but not far enough to penetrate paper filter 308. In this way, the rotating cutter procedure described above may cut through shell 402 but not paper filter 408. However, thumb piece 312 may also be set to a position further forward such that blade 306 may extend far enough to penetrate both shell 402 and paper filter 308. In this way, the rotating procedure described above may cut through both shell 402 and paper filter 408. Given this, it may be preferable that thumb piece 312 and blade sled 304 have enough longitudinal freedom of movement to deploy blade 306 to at least these described positions.

It should be noted that it may also be preferable that front locking tab 356 be adequately deployed over ridge 362 to secure lip 406 as described above at all times that blade 306 may be deployed, regardless of the amount of deployment. That is, front locking tab 356 may secure lip 406 within ridge 362 when blade 306 is deployed enough to cut through shell 402 but not paper filter 308, and when blade 306 is deployed enough to cut through both shell 402 and paper filter 308. In this way, coffee pod 400 is secured within pod holder assembly 200 at all times during operation of cutting device 10 to ensure that blade 306 is not unsafely exposed.

In order to help with the setting of blade 306 at these different positions, there may be tick marks or other types of markings or signals on the top surface of cartridge lid 310 that may represent where thump piece 312 may be positioned in order to deploy blade 306 the desired amount. For instance, there may be a tick mark on the top of lid 310 and a corresponding tick mark on thumb piece 312 that when aligned may signify that blade 306 is deployed enough to penetrate shell 402 but not filter 408. In addition, there may be a second tick mark on lid 310 that when aligned with a corresponding tick mark on thumb piece 312 may signify that blade 306 may be deployed enough to penetrate both shell 402 and filter 308. Note that there may be also be a single tick mark on lid 310 and more than one tick mark on thumb piece 312, with each mark on thumb piece 312 representing a different blade 306 setting when aligned with the single tick mark on lid 310. Other types or numbers of marks may also be used on lid 310 and thumb piece 312 for settings of blade 306.

Note also that any of thumb piece 312, lid 310, blade sled 304 or cartridge 302 may include detents, notches, grooves or other elements or mechanisms that may assist in the setting of thumb piece 312 and the resulting deployment of blade 306 to the desired amount. In fact, any of the components that make up cutting assembly 300 may include such elements or mechanisms.

The benefits of cutter assembly 300 are multifold. It can be immediately seen that when blade 306 may become dull or otherwise damaged, and may need to be replaced, that cutter assembly 300 may be removed from holder assembly 100. Cutter assembly 300 may then be dismantled by generally following the assembly steps described above in reverse order, and blade 306 may be removed. A new or sharpened blade 306 may then be replaced into blade sled 304 and the cutting assembly 300 may be reassembled and configured with holder assembly 100 once again. Alternatively, the entire cutter assembly 300 may be replaced with a new cutter assembly 300. In this way, cutting device 10 may be refurbished to be in near brand new condition whenever necessary with minimal cost and effort.

In another example, pod holder assembly 200 may be removed and replaced with a different pod holder assembly 200. This may be beneficial if a coffee pod 400 of different diameters is to be cut with cutting device 10. It is known in the art that different coffee pods 400 from different manufactures may have different dimensions such that while one type of coffee pod 400 may fit into a particular pod holder assembly 200 to be cut as described above, another type of coffee pod 400 may have a diameter that may be too small or too large to be configured within the same pod holder assembly 200. In this case, it may be preferable that pod holder assembly 200 may be removed from handle assembly 100 so that it may be replaced with a pod holder assembly 200 that may have an opening 204 with the correct diameter to receive the different diameter coffee pod 400.

In this case, pod holder assembly 200 may be attached to handle assembly 100 using threaded grooves so that pod holder assembly 200 may be screwed on and off holder assembly 100. In addition, pod holder assembly 200 may be connected to handle assembly 100 using other attachment mechanisms such as a central post, screws, latches, bolts, clips, pressure fit, friction, grooves and notches, or other types of attachment mechanisms and methods.

In another example, pod holder assembly 200 may be adjustable so that it may receive different types of coffee pods 400 that may have different diameters. For instance, receptacle ring 202 may have the ability to open and expand and/or contract to receive and adequately engage different coffee pods having different diameters. That is, the diameter of opening 204 may be adjusted so that it may fit with different pods 400.

In yet another example, cutting device 10 may include one or more adapters that may be used to allow coffee pods 400 of different diameters to be used with the same pod holder assembly 200. For instance, for coffee pods 400 that may have a diameter that is too small to work with a particular pod holder assembly 200, the adapter may include an inner opening and a circumferential ridge around the opening. In this way, it may have the correct dimensions to receive and hold the smaller coffee pod 400. The adapter may also include an outer diameter with an outer lip that may be configured to fit within opening 204 and circumferential ridge 206 of pod holder assembly 200. It can be seen that with the smaller coffee pod 400 configured within the adapter and the adapter configured within the pod holder assembly 200, that the smaller coffee pod 400 may be configured with and cut by cutting device 10.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A cutting device configured to cut the outer shell of a coffee pod, the device comprising:
   a holder with an opening configured to hold a coffee pod;
   a thumb piece that is movable with respect to the holder;
   a blade that is configured with the thumb piece; and
   at least one locking tab configured to lock the coffee pod within the holder;
   wherein the blade is moved by the thumb piece to cut the coffee pod, and the locking tab locks the coffee pod in the holder.

2. The device of claim 1, wherein the coffee pod is rotated within the holder to cut the coffee pod.

3. The device of claim 1, wherein the blade is moved to different positions to cut the coffee pod at different depths.

4. The device of claim 1, wherein the coffee pod includes an outer shell and an inner filter, and wherein the blade is moved to a first position to cut the outer shell of the coffee pod, and to a second position distinct from said first position to cut the inner filter of the coffee pod.

5. The device of claim 1, wherein the at least one locking tab is configured with the holder to lock the coffee pod within the holder.

6. A cutting device configured to cut the outer shell of a coffee pod, the device comprising:
   a holder with an opening configured to hold a coffee pod that includes an outer shell and an inner filter;
   a thumb piece that is movable with respect to the holder;
   a blade that is configured with the thumb piece; and
   at least one locking tab configured to lock the coffee pod within the holder;
   wherein the blade is moved by the thumb piece to a first position to cut the outer shell of the coffee pod, and to a second position distinct from said first position to cut the inner filter of the coffee pod, and
   wherein the locking tab locks the coffee pod in the holder; and
   wherein the coffee pod is rotated to cut the coffee pod.

7. The device of claim 6, wherein the at least one locking tab is configured with the holder to lock the coffee pod within the holder.

8. The device of claim 6, wherein the holder is removable and replaceable.

9. The device of claim 6, wherein the diameter of the opening in the holder is adjustable.

10. The device of claim 6, further comprising an adapter that is configured to fit within the opening of the holder.

11. The device of claim 6, wherein the at least one locking tab is configured with the thumb piece to lock the coffee pod within the holder.

12. The device of claim 11, wherein the at least one locking tab locks the coffee pod within the holder upon movement of the blade.

13. The device of claim 6, wherein the blade is removable and replaceable.

14. The device of claim 1, wherein the at least one locking tab is configured with the thumb piece to lock the coffee pod within the holder.

15. The device of claim 14, wherein the at least one locking tab locks the coffee pod within the holder upon movement of the blade.

16. The device of claim 1, wherein the holder is removable and replaceable.

17. The device of claim 1, wherein the diameter of the opening in the holder is adjustable.

18. The device of claim 1, further comprising an adapter that is configured to fit within the opening of the holder.

19. The device of claim 1, wherein the blade is removable and replaceable.

20. The device of claim 1, further comprising a handle configured with the holder.

* * * * *